No. 647,923. Patented Apr. 17, 1900.
H. JONCAS, A. E. GAGNON & G. A. DESPAROIS.
LATH BINDING MACHINE.
(Application filed Apr. 27, 1896.)

(No Model.) 6 Sheets—Sheet 1.

Witnesses
B. P. Shepherd
W. E. Gooley.

Inventors
Henry Joncas
Andrew E. Gagnon
Gedeon A. Desparois
By Paul A. Hawley
their attorneys

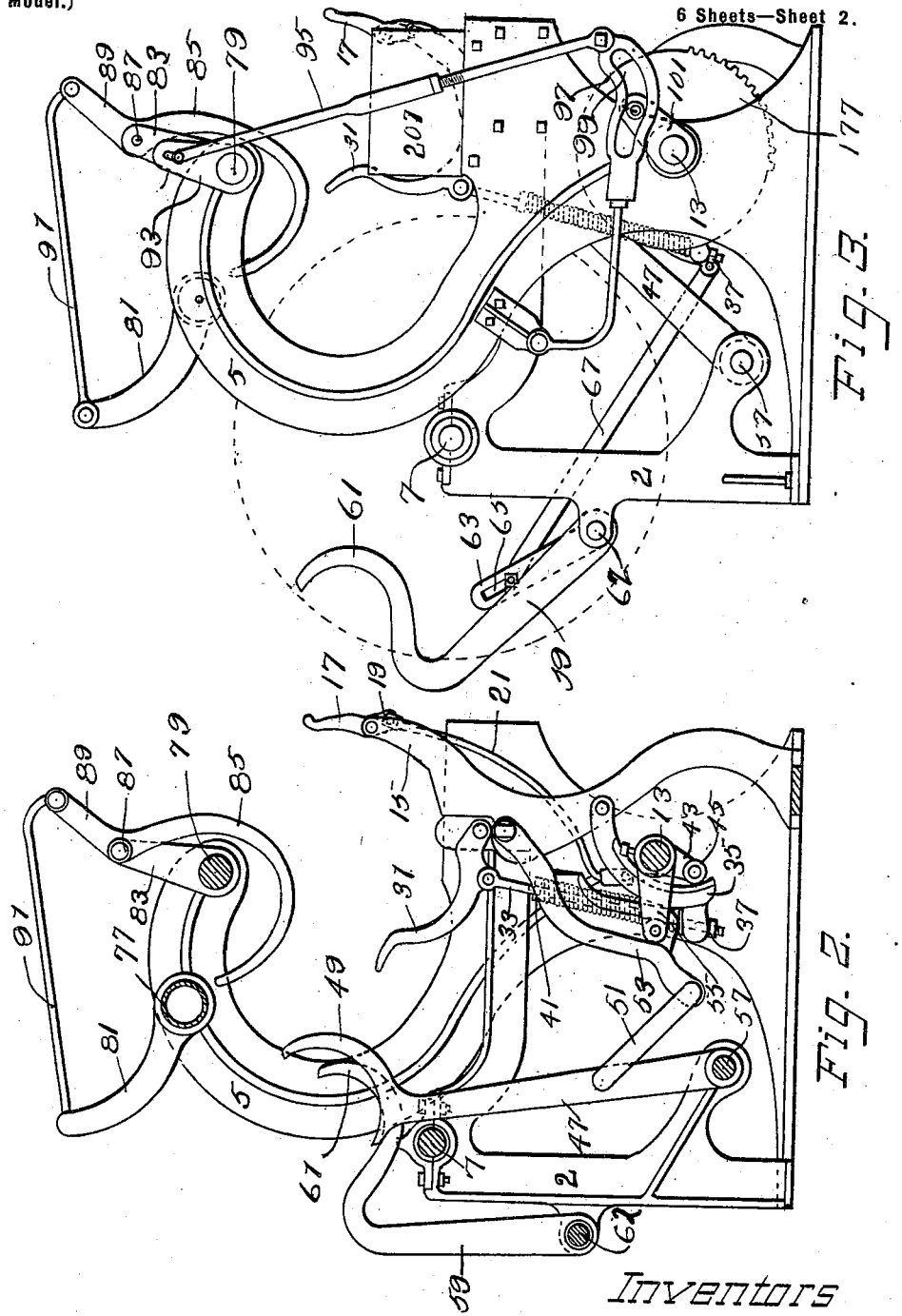

No. 647,923. Patented Apr. 17, 1900.
H. JONCAS, A. E. GAGNON & G. A. DESPAROIS.
LATH BINDING MACHINE.
(Application filed Apr. 27, 1896.)
(No Model.) 6 Sheets—Sheet 3.
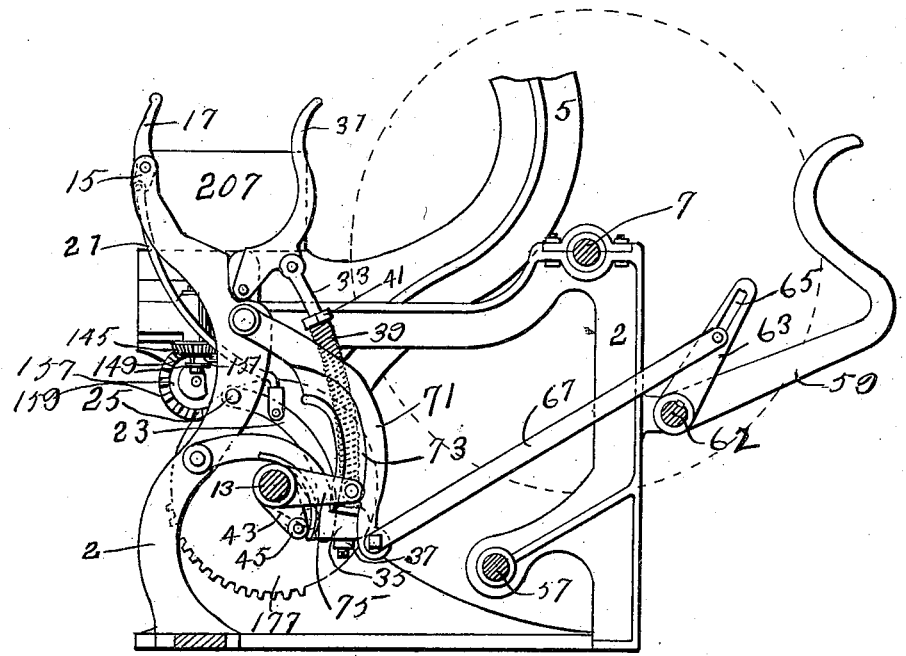
Fig. 4.
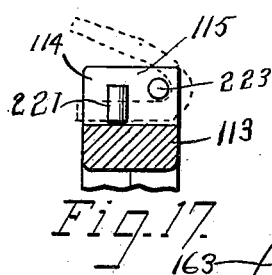
Fig. 17.
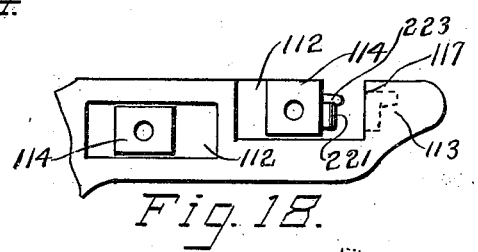
Fig. 18.
Fig. 19.
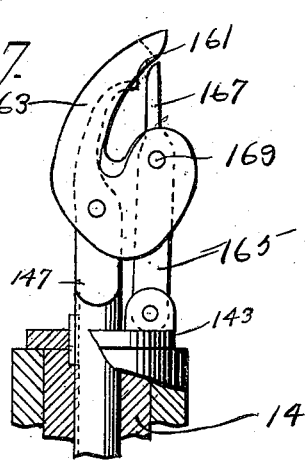
Fig. 5.
Witnesses
B. P. Shepherd
M. E. Gooley.
Inventors
Henry Joncas
Andrew E. Gagnon
Gedeon A. Desparois
By Paul Hawley
their attorneys
THE NORRIS PETERS CO., PHOTO-LITHO., WASHINGTON, D. C.

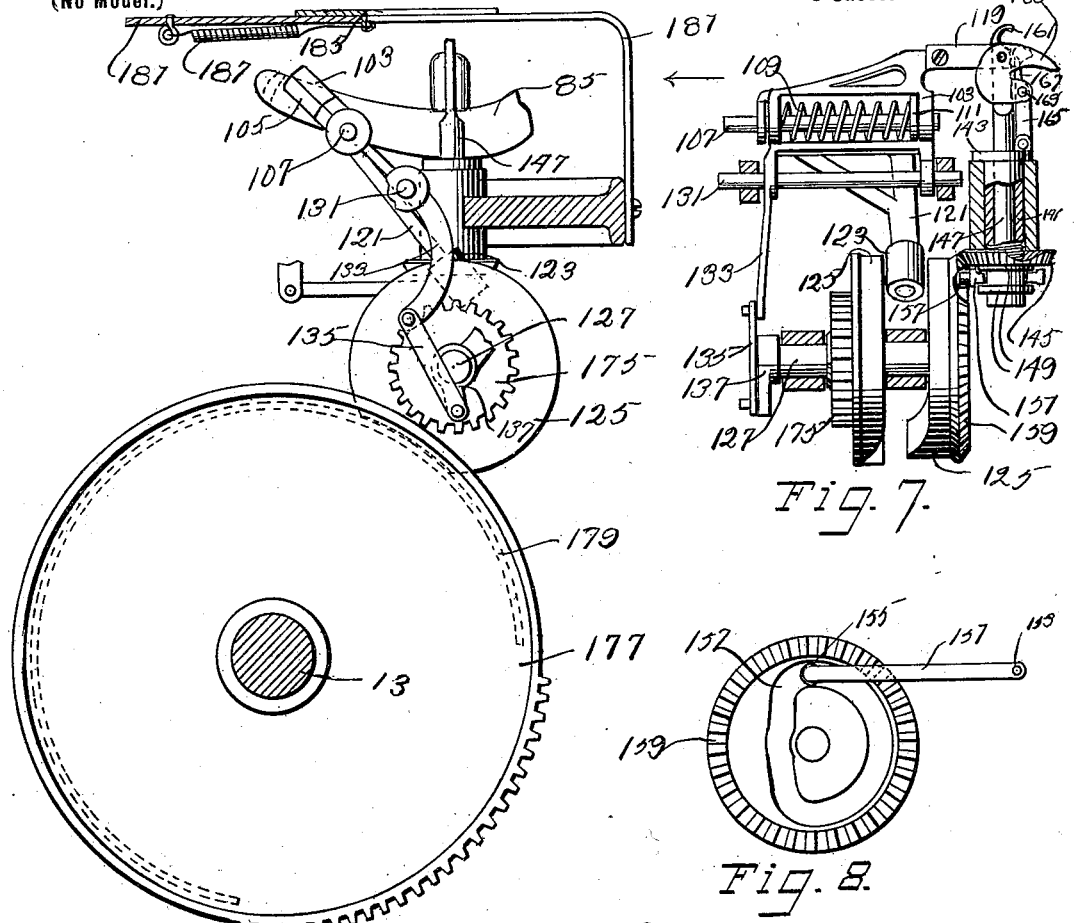

No. 647,923. Patented Apr. 17, 1900.
H. JONCAS, A. E. GAGNON & G. A. DESPAROIS.
LATH BINDING MACHINE.
(Application filed Apr. 27, 1896.)

(No Model.) 6 Sheets—Sheet 5.

Witnesses
B. P. Shepherd
M. E. Gooley

Inventors
Henry Joncas
Andrew E. Gagnon
Gedeon A. Desparois
By Paul & Hawley
their attorneys No. 647,923. Patented Apr. 17, 1900.
H. JONCAS, A. E. GAGNON & G. A. DESPAROIS.
LATH BINDING MACHINE.
(Application filed Apr. 27, 1896.)
(No Model.) 6 Sheets—Sheet 6.
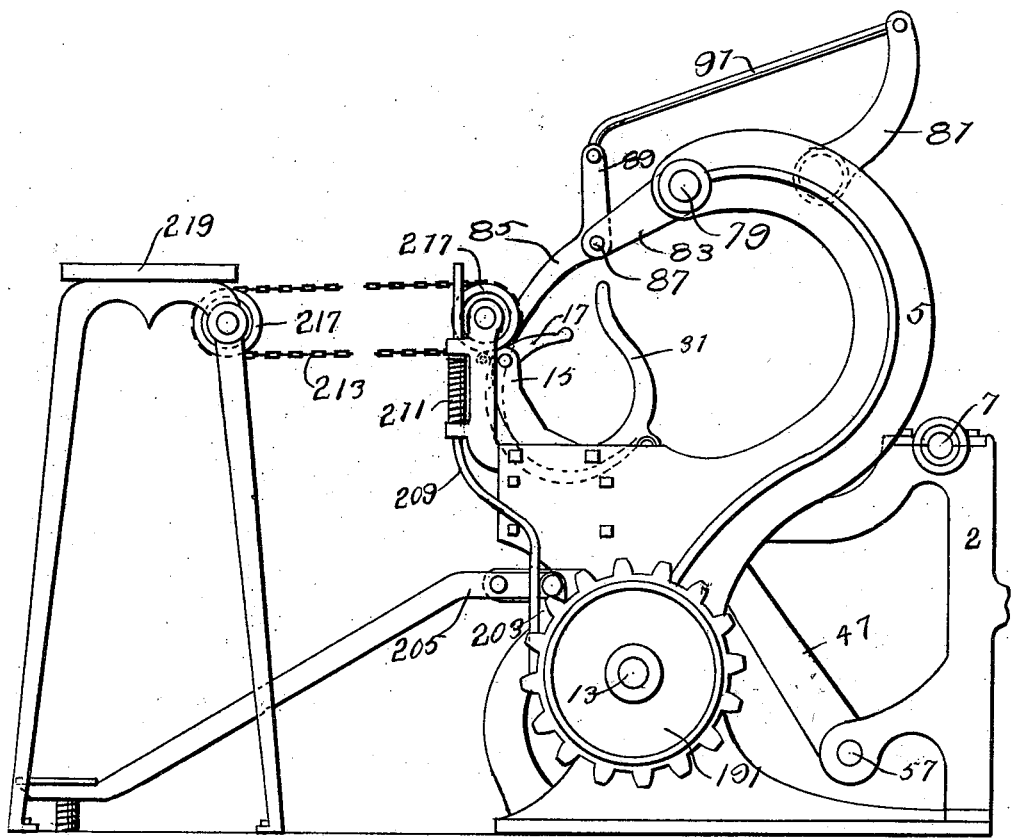
Fig. 14.
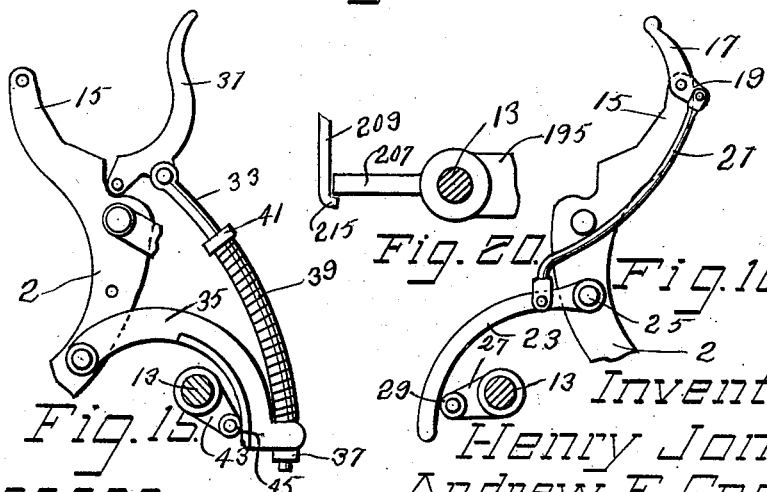
Fig. 15. Fig. 20. Fig. 16.
Witnesses
B. P. Shepherd.
M. E. Gooley.
Inventors
Henry Joncas
Andrew E. Gagnon
Gedeon A. Desparois
By Paul O. Hawley
their attorneys

UNITED STATES PATENT OFFICE.

HENRY JONCAS AND ANDREW E. GAGNON, OF MINNEAPOLIS, AND GEDEON A. DESPAROIS, OF ST. PAUL, MINNESOTA; SAID DESPAROIS ASSIGNOR TO SAID JONCAS AND GAGNON, AND SAID JONCAS ASSIGNOR OF PART OF HIS RIGHT TO SAID GAGNON.

LATH-BINDING MACHINE.

SPECIFICATION forming part of Letters Patent No. 647,923, dated April 17, 1900.

Application filed April 27, 1896. Serial No. 589,282. (No model.)

*To all whom it may concern:*

Be it known that we, HENRY JONCAS and ANDREW E. GAGNON, residing at Minneapolis, Hennepin county, and GEDEON A. DESPAROIS, residing at St. Paul, Ramsey county, Minnesota, have invented certain new and useful Improvements in Lath-Binding Machines, of which the following is a specification.

The object of this invention is to provide an improved machine for binding laths, slats, edgings, &c., and trimming the ends thereof after they are bound; and the invention consists generally in the constructions and combinations hereinafter described, and particularly pointed out in the claims.

Figure 1:
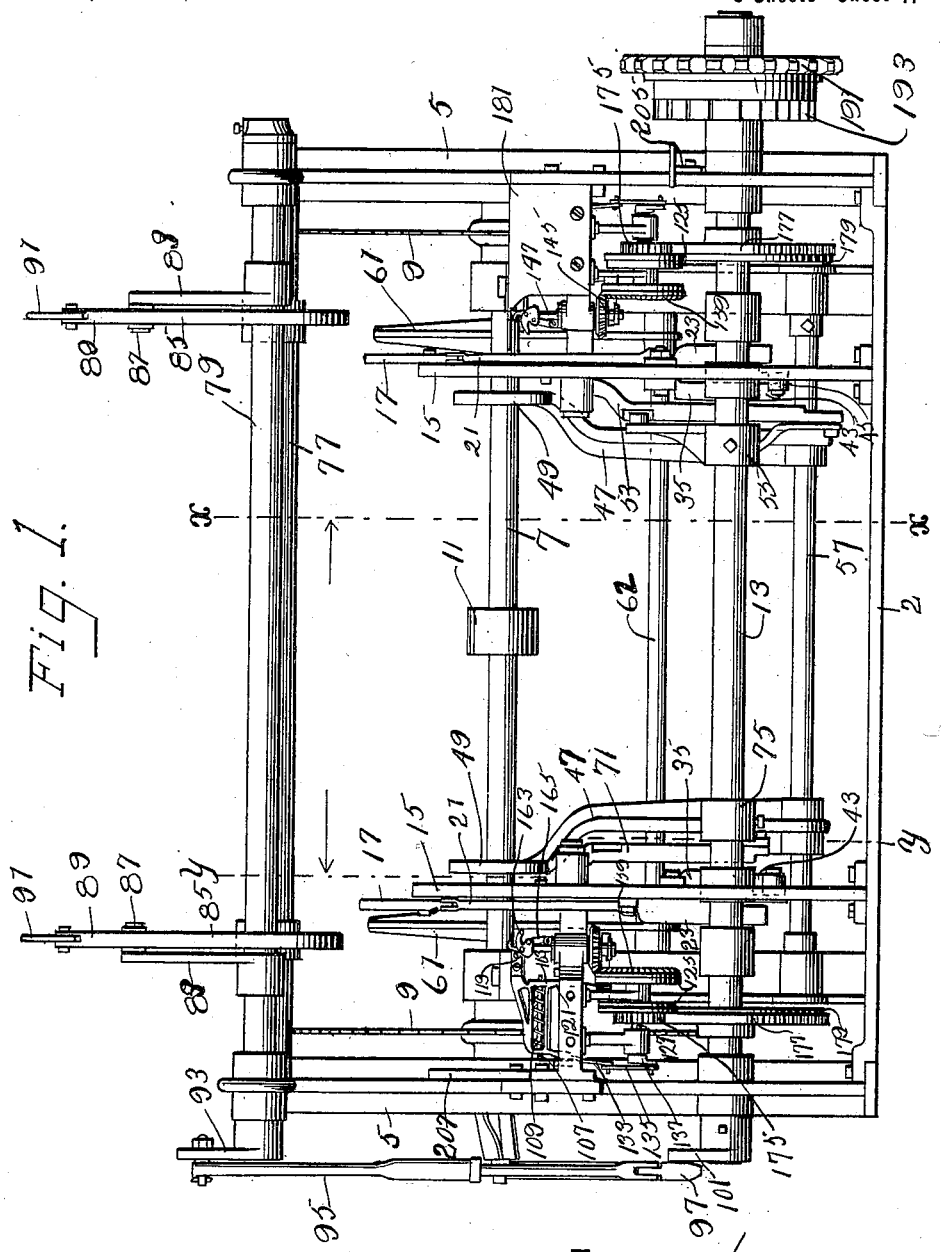
Figures 11, 12:
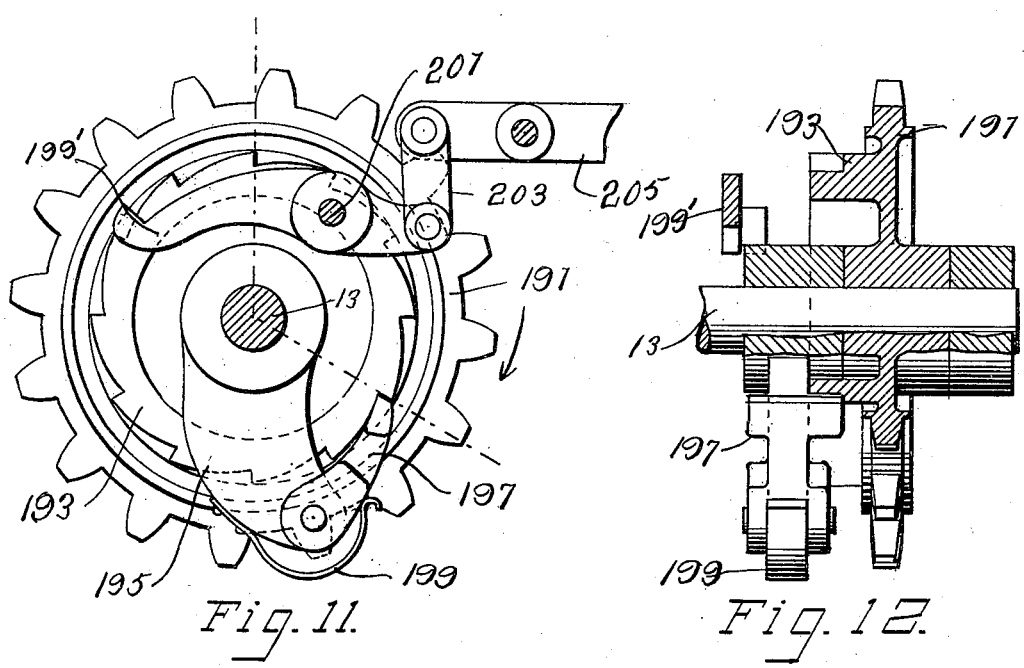
Figure 13:
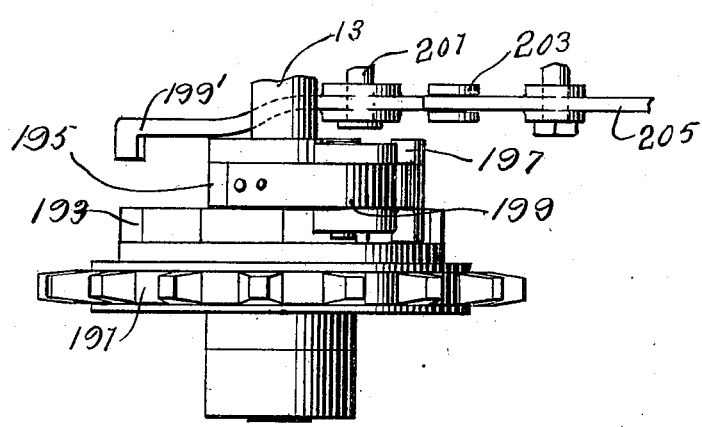

In the accompanying drawings, forming part of this specification, Figure 1 is a side elevation of a machine embodying our invention. Fig. 2 is a transverse section thereof on the line *x x* of Fig. 1. Fig. 3 is an end elevation, the compressors and bundle lifter and carrier being shown in different positions from that which they occupy in Fig. 2 and the saw being indicated by dotted lines. Fig. 4 is a section on line *y y* of Fig. 1 looking in the opposite direction from Fig. 3. Fig. 5 is a detail elevation and partial section of the knotter. Fig. 6 is an elevation of the knotter and cord-holder and the mechanism for operating the same. Fig. 7 is a view of a knotter and cord-holder looking in the direction of the arrow shown in Fig. 6. Fig. 8 is a detail of the means for raising and lowering the hook of the knotter. Fig. 9 is a detail elevation of the cord-holder. Fig. 10 is a plan view showing the shield that is arranged over the knotter for the purpose of guiding the cord and showing also the movable plate that is arranged on said shield. Figs. 11, 12, and 13 are details of the clutch mechanism, Fig. 12 being a section on line *x x* of Fig. 11. Fig. 14 is an end elevation showing means that may be employed for feeding the laths, &c., to the medium. Figs. 15 and 16 are details of the compressor-arms and the means for operating the same. Figs. 17, 18, and 19 are details of the cord-holder. Fig. 20 is a detail of a modification.

The machine is designed to compress the laths or other articles into a compact bundle and then to tie a cord around them, preferably one at each end of the bundle. For this purpose the compressing and the cord-tying mechanism at each end of the machine is duplicated at the other end. After the cords are tied around the bundle it is picked up by the bundle-lifter and is carried forward and placed in the bundle carrier or ejector. During this operation the ends of the laths, if they are uneven, are brought against the saws, by which both ends of the bundles are trimmed. The bundle is then thrown out of the machine and the operation is repeated. The saws are mounted upon an independent and continuously-running shaft, while the other mechanism is thrown into operation after the laths have been placed in position by suitable clutch mechanism.

In the drawings, 2 represents the frame of the machine, which is of a suitable form and construction and is provided with bearings and supports for the various parts of the mechanism. The ends 5 of the frame extend upward and forward upon a curved line and form bearings for the two upper shafts, hereinafter referred to. The shaft 7 is mounted in bearings in the frame 2 and is provided at each end with a suitable circular saw 9. This shaft is also provided with a suitable pulley 11, by means of which it may be driven continuously from any suitable source of power. The saws 9 are arranged at a desired distance apart to furnish laths of the desired length.

Mounted in bearings in the frame 2 is a driving-shaft 13, which constitutes the main shaft of the machine and from which the principal devices and mechanisms are driven. Arranged at the front of the machine and near each end thereof is an upright arm 15, and pivoted to the upper end of said arm is the short or forward compressor-arm 17. This arm is provided with a rearwardly-projecting end 19, which is pivoted to a connecting-rod 21. This rod is pivoted at its opposite end to a curved lever 23, that is pivoted at a suitable point, as 25, to the frame of the machine. A crank-arm 27 on a shaft 13 is provided upon its end with the roller 29, and said roller engages said curved arm 23 once during each revolution of the shaft 13. (See Fig. 16.) This raises the free end of the lever 23 and through the connecting-rod 21 moves the compressor-arm 17 so as to throw it down into nearly a horizontal position, as shown in Fig. 14.

Arranged opposite each of the forward compressors 17 is the rear compressor 31, pivoted at its lower end at a point below the base of the arm 15 and connected by a rod 33 to a pivoted arm 35. The end of the rod 33 passes through an opening in the pivoted arm 35 and is provided with a suitable nut 37. Said rod passes loosely through the opening in the pivoted lever 35, and a spring 39 bears at one end upon the lever 35 and at its opposite end upon the fixed collar 41 upon the connecting-rod 33. (See Fig. 15.) The shaft 13 is provided with the crank-arm 43, having preferably a roller 45 at or near its end, and said roller engages the curved surface of the lever 35. By this means as the shaft 13 revolves the compressor-arm 31 is raised and forced toward the upright arm 15 and the compressor-arm 17; but the compressor-arm 31 is capable of yielding to any necessary extent, owing to the spring connection between the lever 35 and the rod 33. The parts being in the position shown in Fig. 3, the laths are placed in the space between the stationary arm 15 and the compressor-arm 31. The rotation of the shaft 13 causes the arms 31 and 17 to be forced toward each other, in which position they are held with the laths pressed into a compact bundle while the cord is being tied around the bundle by the means hereinafter described. After the cords are tied around the bundle the rear compressor-arms 31 are depressed or moved back into the rear position. (Shown in Fig. 2.) The bundle is then lifted and carried forward past the saws, during which movement the ends of the bundle are trimmed, and the bundle is then thrown out of the machine.

At each end of the machine is pivoted an upright arm 47, having at its upper end the curved bundle-lifting arm 49. This arm is connected by the connecting-arm 51 to the end of the irregular pivoted lever 53, and an arm 55 on the shaft 13 is provided with a suitable roller, which engages the lever 53, moving said lever and at the same time giving the desired movement to the upright arm 47. By this means the arms 47 are moved from the position shown in Fig. 3 to the position shown in Fig. 2. The arms 47 occupy the position shown in Fig. 3 while the laths are being placed in position in the machine, and after the cords are tied around the laths these arms move forward to the position shown in Fig. 2, carrying the bundle with them. Both of the arms 47 are preferably mounted and secured upon the rock-shaft 57, so that both move together, and only one lever 53 and crank-arm 55 is necessary for moving both arms. When the arms 47 get to the position shown in Fig. 2, the bundle is picked up by the ejector-arms 59, having the curved bundle-lifting end 61, and these arms move forward to the position shown in Fig. 4 and throw the bundle out of the machine. The arms 59 are preferably secured on the rock-shaft 62, and said rock-shaft is preferably provided with the crank-arm 63, having an adjusting-slot 65 therein, and a connecting-rod 67 is connected to the arm 63 by means of said slot 65, and the opposite end of said rod 67 is pivotally connected to the lever 71, which has its opposite end pivoted upon the frame of the machine. (See Fig. 4.) The lever 71 is provided with the curved groove 73, and a crank-arm 75, arranged upon the shaft 13, is provided with a suitable roller or stud, that engages said groove 73 and gives to the lever 71 and the pivoted arms 59 the desired movement.

While the arms 47 and 59 are carrying the bundle from the point where the cords are tied around it to the point where it is thrown out of the machine, the ends of the bundle are subjected to the action of the saws, by means of which the ends of the laths are cut off to a uniform length.

We will now proceed to describe the means for passing the cord around the bundle and tying its ends together.

Mounted in bearings in the upper parts 5 of the frame 2 of the machine are the rock-shafts 77 and 79, to which are secured the arms 81 and 83. A needle-bar 85 of suitable curved form is pivoted at 87 to the end of the arm 83. The needle 85 is provided with a rearwardly-projecting arm 89, and a rod 91 is pivotally connected to the end 89 of said needle and to the arm 81. The end of the rock-shaft 79 is provided with a crank-arm 93, and an adjustable connecting-rod 95 is adjustably pivoted to the said arm 93 and is also pivoted to the lever 97, that has one end pivoted to the frame of the machine. The lever 97 is provided with a slot 99, and the shaft 13 has a crank 101, provided with a pin or stud that projects into said slot 99. This construction gives to the shaft 79 a back-and-forth or rocking movement, such as is necessary to permit the needle to pass the cord around the bundle and then return to its former position. The cord passes around the outer or curved surface of the needle and through a hole or eye near the end thereof, and its free end is held by a cord-holder, which consists, preferably, of two suitable frames 103 and 105, connected together by a rod 107, said rod permitting said frames to move longitudinally with respect to each other, the movement being preferably accomplished by permitting the frame 105 to move lengthwise on the rod 107. A spring 109 surrounds the rod 107 and bears at one end upon the frame 103 and at its opposite end upon the rod 111 upon the frame 105, said rod being arranged to project into the central opening of the frame 103, as shown in Figs. 7 and 9. The frames 103 and 105 are provided with cord-holding fingers 113 and 115, (see Figs. 17, 18, and 19,) said finger 113 being provided with the slots 112, into which extend rectangular projections 114 from the finger 115. Said finger 113 is provided with a shoulder 117, against which the end of the finger 115 is adapted to bear, whereby the cord is held between the end of the finger 115 and said shoulder 117. A knife 119 is secured to the projections 114 on the finger 113 so that it bears against the side of the finger 113. This knife is shown in full lines in Fig. 7, and its position is indicated in dotted lines in Fig. 9. The sharp edge of the knife is substantially on a line with the end of the finger 115, so that when said finger 115 is closed against the shoulder 117 upon the finger 113 the edge of said knife passes by the edge of said shoulder and cuts off the cord, leaving the free end of the cord that passes from the needle held between the fingers 115 and 113, while the part which has been separated forms the binder for the bundle of laths being operated upon. The frame 105 has the depending arm 121, preferably provided at its end with the roller 123, (see Fig. 9,) and this roller extends between the cam-surfaces of two corresponding rolls 125, secured upon a short shaft 127. This cam through the lug 121 gives the requisite movement to the frame 105 to open and close the cord-holder.

The frame 103 is pivotally supported upon a rod or short shaft 131, which is secured to suitable supports upon the frame of the machine. The frame 103 is also provided with the lever-arm 133, which is connected by a link 135 to a crank-shaft 137 upon the shaft 127. This gives to the cord-holder at the requisite intervals a rocking movement that carries the knife and the cord-holding fingers toward the knotter, hereinafter described.

The knotter is shown in detail in Figs. 5, 6, 7, and 8. It consists, essentially, of a hollow shaft 141, mounted in a suitable bearing upon the frame of the machine and provided at its upper end with a collar 143 and being screw-threaded at its lower end and having secured thereon by means of said screw-thread below the bearing the bevel-pinion 145. A shaft 147 is arranged within the hollow shaft 141 and is capable of a vertical movement therein; but said shaft is arranged to rotate with the hollow shaft 141. The lower end of the shaft 147 is provided with the two collars 149, between which rest the two ends of a forked lever 151, said lever being pivoted at its opposite end 153 to a suitable stationary support. One fork of the lever 151 is provided with a projection, preferably carrying an antifriction-roll 155, which extends into a groove 157, arranged in the face of a bevel gear-wheel 159, that is secured to the face of the cam 125 or directly to the shaft 127. The upper end of the shaft 147 is provided with a hooked end 161, as shown in Figs. 5 and 7, and a pivoted tying-bill 163 is arranged upon the upper end of said shaft 147. This tying-bill is cut out at its central portion, so that the hook 161 extends through it. A link 165, having on its upper end a finger 167, is pivoted to the upper end of the hollow shaft 141 and extends through the tying-bill 163 and is connected thereto by a single pivot 169. When the shaft 147 is raised to its highest position, the tying-bill, the hook 161, and the finger 167 occupy the position shown in Fig. 7. When this shaft is lowered, the parts occupy the position shown in Fig. 5.

After the laths have been properly compressed, one end of the cord being held by the cord-holder, the needle passes the cord around the bundle and lays it in the cord-holder. While one end of the cord is held in the cord-holder and the other end of the loop is held by the needle, the parts of the knotter being in the position shown in Fig. 7 and the two strands of the cord being laid into the bill of the knotting-hook, the knotter is rotated upon its axis, winding the cord around the knotting-bill and bringing the ends under the hook 161. The cord at this point is severed and the end held by the cord-holder is released. The shaft 147 is lowered and the parts of the knotter are turned to the positions shown in Fig. 5. The hook 161 pulls the cord through the loop formed by wrapping the cord around the knotter, and the movement of the bundle pulls the loop off from the tying-bill, this movement being assisted by the finger 167, which as the knotting-bill is turned to the position shown in Fig. 5 pushes the loop toward the end of the bill.

The shaft 127 is provided with the pinion 175, and a driving-wheel 177 is arranged upon the shaft 13. This wheel is provided upon a part of its circumference with a series of gear-teeth which engage and rotate the wheel 175. The remaining portion of the circumference of the wheel 177 is blank, and the side of said wheel is provided with a rib 179, that engages a cut-away portion of the cam 125, as shown in Fig. 6, so as to hold the shaft 127 positively in a stationary position, except when the teeth of the wheel 177 are in engagement with the teeth of the gear-wheel 175.

We prefer to provide a shield 181, that is secured upon the frame of the machine and extends above the knotter, as shown in Fig. 6. This shield is provided with a slot 183, through which the needle-bar is projected and through which the cord extends, the bundle being arranged above said shield. The slot in the shield serves to hold the two strands of the cord close together and guides the cord while the bundle is being carried along and the knot is being completed. For the purpose of insuring both strands of the cord being brought together while the knotting operation takes place we provide upon the shield 181 the guide-plate 185, which has a slot coinciding with the slot 183 in said shield. A spring 187 has one end secured to this guide-plate and its opposite end secured to a projection upon the shield, as shown in Fig 6. When the guide-plate is drawn back as far as it will move, the end of the slot in the guide-plate coincides with the end of the slot 183 in the shield 181. The guide-plate 185 is provided with a lug 189, that projects beyond the edge of the shield 181 in position where it is encountered by the compressor-arm 31. As the compressor-arm is moved up it strikes the lug on the shield 185 and moves said guide-plate so that the end of its slot comes directly over the top of the knotter. This causes the two strands of the cord to be held in proper position while the knotter is being rotated for the purpose of forming a loop therein. When the compressor is released, the guide-plate moves back the limit of its movement, which permits the cord to lie in the end of its slot while the laths are being put in position instead of extending through that portion of the slot that is directly over the knotting-bill.

Any suitable means may be used for imparting motion to the shaft 13. We prefer to use for this purpose the mechanism shown in Figs. 11, 12, and 13. As here shown, a sprocket-wheel 191, having formed integrally with it a ratchet-wheel 193, is mounted loosely upon the shaft 13. Power is applied to this wheel, so as to drive the same continuously. An arm 195, secured upon the shaft 13, is provided with a pawl 197 and spring 199. This pawl is adapted to engage any one of the ratchet-teeth upon the wheel 193. A tripping-dog 199' is mounted on a suitable support 201 and is connected by a link 203 to a pivoted operating-lever 205. The end of the dog 199' projects into the path of the pawl 197, as shown in Figs. 11, 12, and 13, and as the wheel 191 is rotated the arm 195 and shaft 13 are carried with said wheel until the pawl 197 rides over the end of the dog 199', whereby said pawl is raised and held out of engagement with the teeth of said ratchet-wheel. The shaft 13 then remains stationary until such time as the operator through the lever 205 lowers the dog 199', permitting the pawl 197 to engage one of the teeth of the ratchet-wheel.

We prefer to provide a plate 207, (see Fig. 4,) against which the ends of the laths at one end of the bundle are piled as the laths are put into the machine for the purpose of bringing the laths substantially all in the same position in the bundle.

We prefer in some instances to provide means for automatically advancing the laths or other strips to the machine, and in Fig. 14 of the drawings we have shown a construction that is applicable for this purpose. As here shown, 219 is a table upon which the strips may be piled. 213 is an endless carrier passing over rolls 217 and driven by suitable means. (Not shown.) The laths or slats piled upon the carrier 213 will be carried forward and dropped into the space between the arms 15 and 31. For the purpose of preventing the laths from being fed in while the binding operation is taking place we provide the stops 209, having the springs 211, by means of which said stops may be elevated, so as to come above the upper surface of the carrier 213 and stop the slats or laths while the binding operation is taking place. These stops will be depressed at the proper intervals, so as to permit the slats to enter the space between the arms 15 and 31. We have shown one construction which may be used for depressing the stops 209. This is shown in detail in Fig. 20. As here shown, we provide a projection 215 at the lower end of the stop 209, and we provide the arm 195 with the projection 207, that is adapted to engage the projection 215 on the stop 209 and depress said stop and hold it depressed during the interval while the arm 195 remains stationary, which is the interval between the binding operation. Any other suitable mechanism may, however, be used for the purpose of depressing these stops.

For the purpose of holding the cord firmly we prefer to provide one finger of the cord-holder at its end with suitable projections and the opposite finger with suitable corresponding depressions, with which such projections are adapted to engage. These projections are shown in Figs. 17, 18, and 19 of the drawings. The projection 221 is of substantially-rectangular form and is arranged in the end of the finger 115 opposite the shoulder 117, and said shoulder 117 is provided with a recess adapted to receive said projection, said recess being indicated by dotted lines in Fig. 18. The end of the finger 115 is also preferably provided with the pin or cylindrical projection 223, which is adapted to engage a corresponding recess in the shoulder 117, said recess being shown also by dotted lines in Fig. 18. When the cord is placed in the cord-holder between the end of the finger 115 and the shoulder 117, as indicated by dotted lines in Figs. 17 and 19, and the fingers closed together, the projection 221 engages the cord and crowds it into the recess in the shoulder 117. This gives the holder a firm grasp upon the cord and prevents it from being pulled out of the holder. The projection 223 passes above the cord, as shown by dotted lines in Fig. 17, and engaging the corresponding recess in the shoulder 117 forms a lock above said cord which prevents the cord from being pulled out of the holder. The cord will assume the position shown by dotted lines in Fig. 17 while the tying operation is being carried out.

In some instances we prefer to construct the cord-holder so that the shoulder 117 is on the under side of the finger 113, arranging the finger 115 so that it comes against this shoulder, as in the form shown. This brings the opening to the cord-holder on the lower side of the fingers, and the cord will be brought into the cord-holder by the upward movement of the end of the needle just before it reaches the position shown in Fig. 6.

It will be understood that many of the details of the construction may be varied without departing from our invention.

Having thus described our invention, we claim as new and desire to secure by Letters Patent—

1. A lath-binding machine, comprising, in combination, a suitable saw and means for driving it, means for compressing the laths into a bundle, automatic means for tying the cords around the bundle, the pivoted lever 47 provided with the bundle-carrying arms 49, and means for automatically swinging said lever to move the carrying-arms, and the laths thereon, past said saw, substantially as described.

2. The combination, in a lath-binding machine, with the fixed and yielding compressing-arms, and means for operating the same, of the pivoted lever 47, the arms 49 thereon, the pivoted arm 53, the link 51 connecting said arm 53 and lever 47, the shaft 13 and the crank thereon in position to engage said arm 53 after the bundle has been compressed, for the purpose set forth.

3. The combination, with the fixed arms 15, the short compressor-arms 17 pivoted thereto, the oppositely-arranged compressor-arms 31 mounted upon suitable pivots, the pivoted lever 23, the rod 21 connecting the compressor-arm 17 with said lever 23, the pivoted lever 35, the arm 33 and spring 39 connecting the compressor-arm 31 with said lever 35, the shaft 13, and the crank-arms 43 and 27 for moving said levers and compressor-arms, for the purpose set forth.

4. The combination, with means for compressing the laths and means for tying cords around them, of the pivoted levers 47 provided with the bundle-carrying arms 49, and the levers 59 provided with the arms 61 adapted to take the bundles from the arms 49 and pass them out of the machine.

5. The combination, with the needle and cord-holder, of the knotter, comprising the rotatable hollow shaft, the longitudinally-movable shaft arranged therein and provided at its end with a suitable hook, the knotting-bill pivoted to said movable shaft and provided with an opening through which said hook passes, and a suitable link having a finger on its end, said link being pivoted to said hollow shaft and also to said knotting-bill, for the purpose set forth.

6. The combination, with the rotatable hollow shaft 141, of the longitudinally-movable shaft 147 arranged therein and provided upon its upper end with a hook 161, the knotting-bill 163, to which the shaft 147 is pivoted, and through which said hook 161 extends, the link 165 pivoted to the shaft 141 and to said knotting-bill 163, and provided with the finger 167, substantially as and for the purpose set forth.

7. The combination, with the frames 103 and 105 provided respectively with the fingers 113 and 115, said frames being connected together by a shaft 107, the spring 109 surrounding said shaft and engaging said frame, and the shaft 131 upon which one of said frames is mounted, and upon which said frames are adapted to be rocked, for the purpose set forth.

8. A lath-binding machine, comprising, in combination, a suitable saw and means for driving it, means for compressing the laths into a bundle, automatic means for tying the cords around the bundle, bundle-carrying arms, means for automatically swinging said arms and laths thereon past said saw, and the ejector-arms to receive the bundle after it has been carried past said saw, for the purpose set forth.

9. The combination, with means for compressing the laths and means for tying the cords around them, of the pivoted carrying-arms for moving the laths past the saw, the ejector-arms arranged to receive the laths from said carrying-arms, and means for operating said ejector-arms, for the purpose set forth.

10. In a lath-binding machine, the combination, of the rock-shaft 61, the ejector-arms mounted thereon, the crank-arm 63, the pivoted lever 71, the arm 67, connecting said crank-arm and said lever, and means engaging said lever 71 to rock said shaft and operate said ejector-arms, substantially as described.

11. In a lath-binding machine, in combination with suitable saws and means for driving them, a compressor device, means for tying cords around the bundle of laths after being compressed, carrier-arms, and means for automatically opening said compressor device and operating said carrier-arms to pick up the bundle and carry it past the saws to be trimmed, substantially as described.

12. In a lath-binding machine, means for compressing the laths into a bundle and means for tying cords around them, the saws, and means independent of the compressing device for gathering up and moving the bundle past the saws to trim its ends, substantially as described.

13. In a lath-binding machine, in combination with suitable saws and means for driving them, forward and rear compressor-arms, one being yieldingly supported, a driving-shaft, suitable connections between said shaft and said arms whereby the revolution of said shaft will operate said arms to compress or release a bundle of laths, a tying mechanism, and independent means for picking up said bundle after being tied and released by said arms and carrying the same past the saws to trim its ends, substantially as described.

14. In a lath-binding machine, a frame, saws mounted therein, means whereby the bundle of laths is moved past the saws to trim its ends, and ejector-arms mounted in said frame in position to engage the bundle after its ends are trimmed and eject it from the machine, substantially as described.

15. In a lath-binding machine, a frame, saws mounted therein, a compressing device, means for operating the same, a tying mechanism, carrying-arms to move the bundle from said compressing device past said saws, and means for operating said carrying-arms, substantially as described.

16. In a lath-binding machine, a frame, saws mounted therein, a compressing device, means for operating the same, means for tying cords around the bundle, means for moving the bundle past the saws to trim the ends, and means for ejecting the bundle out of the machine, substantially as described.

17. In a lath-binding machine, a frame, saws mounted therein, a compressing device, a tying mechanism, carriers to move the bundle from said compressing device past said saws, and means for operating, successively, said compressing, tying and carrying devices, substantially as described.

18. In a lath-binding machine, a frame, saws mounted therein, a compressor device, a tying mechanism to bind a cord about the bundle, a carrier device to move the bundle from the compressor device past the saws, a driving-shaft and suitable mechanisms in connection with said shaft and said compressing, tying and carrying devices for operating said devices successively to compress, tie, and carry a bundle, substantially as described.

19. In a lath-binding machine, a frame, saws mounted therein, a compressor device, a tying device for looping and tying a cord around the bundle, a carrier device for moving the bundle from said compressor device past the saws, an ejector device, a driving-shaft and suitable connections between said driving-shaft and said compressing, tying, carrying and ejecting devices for operating the same successively to compress, tie, carry and eject a bundle, substantially as described.

20. In a lath-binding machine, a frame, shafts 77 and 79 mounted therein, the arms provided thereon, a pivoted connection between said arms, a needle-bar pivoted on one of said arms, a crank-arm 93 provided on said shaft 79, a driving-shaft 13 and means connecting said driving-shaft with said crank-arm 93, whereby the revolution of said driving-shaft will rock said shaft 79 and swing said needle-bar, substantially as described.

21. The combination, in a lath-binding machine, of the rock-shaft 57, carrying-arms 47 thereon, a lever 53, means connecting said lever and said carrying-arms, and means engaging said lever to rock said shaft and operate said carrying-arms, substantially as described.

22. In a lath-binding machine, the combination, with suitable saws and means for operating the same, of forward and rear compressor-arms, means for forcing said arms toward each other to compress the bundle of laths and depressing the rear arms to release the bundle, and carrier means to engage the bundle and move it past the saws, substantially as described.

23. In a lath-binding machine, the combination, with suitable saws and means for driving the same, of forward and rear compressor-arms, means for operating said arms to compress a bundle of laths, and means operating independently of said compressor-arms for gathering up the bundle and moving it past said saws to trim its ends, substantially as described.

24. In a lath-binding machine, the combination, with the saws and means for driving the same, of means for compressing the laths into a bundle, independent means for moving the bundle past the saws to trim its ends, and means for operating successively said compressing and carrying means, substantially as described.

25. In a lath-binding machine, the combination, with the saws, and means for driving the same, means for carrying a bundle of laths past the saws to trim its ends, independent means for ejecting a bundle out of the machine and means for operating successively said carrying and ejecting means, substantially as described.

26. In a lath-binding machine, the combination, with the saws and means for operating the same, of automatic compressing and tying means, independently-swinging carrying-arms whereon the bundle is supported and moved past the saws to trim its ends, and means for successively operating said compressing, tying and carrying means, substantially as described.

27. In a lath-binding machine, the combination, with the saws and means for driving the same, of compressing and tying devices, independently-swinging carrier-arms to move the bundle past the saws, independently-swinging ejector-arms to receive the bundle from the saws, and means for operating successively said compressing, tying, carrying and ejecting devices, substantially as described.

28. In a lath-binding machine, the combination, with the saws and means for driving the same, of forward and rear compressor-arms, carrying-arms, means for operating said compressor-arms to compress the bundle and for automatically separating said arms to permit the bundle to be disengaged therefrom by said carrying-arms and moved past the saws to trim its ends, substantially as described.

29. In a lath-binding machine, the forward compressor-arm 17, the pivoted arm 23, the rod 21, the rear compressor-arm 31, the rod 33, the spring 39, the arm 35 connected with said rod 33, and the shaft 13 having crank-arms engaging said arms 23 and 35, substantially as described.

In testimony whereof we have hereunto set our hands this 21st day of March, A. D. 1896.

HENRY JONCAS.
ANDREW E. GAGNON.
GEDEON A. DESPAROIS.

In presence of—
C. G. HAWLEY,
M. E. GOOLEY.